United States Patent [19]

De Vrieze

[11] 3,988,285

[45] Oct. 26, 1976

[54] PROCESS FOR THE ADDITION OF ADDITIVES TO THERMOPLASTICS

[75] Inventor: Christiaan G. De Vrieze, Schinnen, Netherlands

[73] Assignee: Stamicarbon B.V., Geleen, Netherlands

[22] Filed: Mar. 4, 1975

[21] Appl. No.: 555,273

[30] Foreign Application Priority Data
Mar. 5, 1974 Netherlands .................. 7402925

[52] U.S. Cl. ............ 260/33.6 PQ; 106/243; 106/285; 260/23 H; 260/34.2
[51] Int. Cl.² .................................. C08K 5/01
[58] Field of Search ......... 260/23 H, 33.6 PQ, 34.2; 106/285, 243

[56] References Cited
UNITED STATES PATENTS

| | | | |
|---|---|---|---|
| 2,770,609 | 11/1956 | Symonds | 260/23 H |
| 3,000,841 | 9/1961 | Ware | 260/23 |
| 3,447,883 | 6/1969 | Boyer et al. | 8/4 |
| 3,582,503 | 6/1971 | Horne | 260/23 H |
| 3,594,342 | 7/1971 | Ratzsch | 260/34.2 |
| 3,694,402 | 9/1972 | Essam | 260/34.2 |

FOREIGN PATENTS OR APPLICATIONS 1,437,969  3/1966  France

*Primary Examiner*—Lewis T. Jacobs
*Assistant Examiner*—H. H. Fletcher
*Attorney, Agent, or Firm*—Cushman, Darby & Cushman

[57] ABSTRACT

The invention is directed to a method for the addition of additives, for instance, heat-stabilizers, antioxidants, UV-stabilizers, internal or external lubricants, antistatic agents, antiblocking agents, corrosion-inhibitors, and the like, to thermoplastics, by melting the additive in mineral oil to form a melt and then adding the melt to the processing of thermoplastic resins. By mixing additives with the mineral oil, the additives may be melted or dissolved in the mineral oil at temperatures less than the melting point of said additives.

7 Claims, No Drawings

PROCESS FOR THE ADDITION OF ADDITIVES TO THERMOPLASTICS

BACKGROUND OF THE INVENTION

The invention relates to a process for the addition of additives to thermoplastics. In particular, the invention is directed to adding additives to thermoplastics which in processing are obtained as a solution or melt.

Generally, in the processing of thermoplastics, e.g. polyolefins such as homopolymers and copolymers of ethylene, propylene, butene-1,4-methyl pentene-1, and the like, additives are added to said thermoplastics to improve the properties of those thermoplastics. For instance, by additives is meant, heat-stabilizers, antioxidants, UV-stabilizers, internal or external lubricants, antistatic agents, antiblocking agents, corrosion-inhibitors, and the like.

Thermoplastic polyolefins may be prepared and obtained as powders, which may be processed into granules. Additives for improving the properties of the resulting thermoplastic may be mixed directly with the powdery plastic material or the additive may be mixed with a part of the powdery plastic material to form a master batch; the master batch is added to and mixed with the remainder of the thermoplastic powdery plastics material. Thermoplastic polyolefins may also be obtained as products in solution. For instance, methods of preparing polyolefins which are obtained in solution have been developed, particularly for high density polyethylene, i.e. polyethylene with a density of at least 0.94. Such processes have been described, for example, in U.S. Pat. No. 2,862,917 and U.S. Pat. No. 3,491,073, and in British Patent Specifications 1,235,062 and 1,251,177. When solution polymerization techniques are employed to produce polyolefins, particularly polyethylene, a polymer melt is recovered which is subsequently extruded into, for instance, granules.

As set forth above, there are instances in which the addition of additives to the polyolefins is desirable. Such additives include heat stabilizers, antioxidants, UV-stabilizers, internal or external lubricants, antistatic agents, antiblocking agents, corrosion-inhibitors, and the like. The addition of measured amounts of such additives to a polymer melt presents practical difficulties.

Most additives can be dissolved. However, some additives, such as carbon black, metal carbonate and oxides, are insoluble. In overcoming such a problem, it could be possible to dissolve the soluble additives and to disperse insoluble additives, if any, in these solutions. Solutions or suspensions of this type could be fed to the extruding device in which the polymer is processed into granules.

Alternatively, in instances where one solvent may not act to dissolve all additives, it is possible to dissolve those additives in a number of solvents, prior to introducing the additives to the extruder. However, use of solvents containing such additives, which are subsequently fed to an extruder, presents certain disadvantages. In order to extrude solvent-containing material, specially adapted vented extruders must be used. Vented extruders are very expensive. The use of suspensions of additives has similar drawbacks because of the nature of the suspending agents.

The majority of the solid additives, used in the processing of thermoplastic polyolefins, can be melted. The melting points of such additives usually are less than 250° C. Such fusible additives may be added in measured amounts in the molten state, but addition of measured amounts of molten additives appears to present several problems. The addition is effected gradually and it will be necessary to keep the additives in the molten state for some time. Although the aggregate of additives may contain inorganic compounds, the aggregate consists to a considerable extent of organic or metal-organic compounds which, in most cases, readily discolor at elevated temperatures. The temperatures at which the fusible components will completely melt vary widely. As the melting point increases, the undesirable discolorations increase.

To limit discolorations as much as possible, the temperature of the melted additive must be kept as low as possible, i.e. at or slightly over the melting point of said additive. Even then, undesirable discolorations are often found to occur. If the temperature drops below the melting point, the molten mass sets substantially or completely to a hard solid cake. Local cooling can readily occur in feed pipes and valves. The formation of a hard solid cake will easily give rise to plugging.

The invention aims at providing a process for the addition to thermoplastic of additives that, at least for the greater part, can be melted at temperatures below 250° C.

SUMMARY OF THE INVENTION

The process according to the invention is characterized in that the solid additives to be added, which consist predominantly of substances that can be melted at temperatures of at most 250° C, are mixed with a mineral oil that can be considered non-volatile under the usual processing conditions of the plastics material, this mixture is melted, at least the greater part of it, and then added in the molten state to the dissolved or molten plastics material.

The process according to the invention is particularly suitable for the addition of additives to plastics that are obtained as melts or solutions in their preparation. Solutions are usually processed into a melt by removing the solvent, e.g. by evaporation. A plastics melt is usually processed in an extruder, e.g. into granules. It is now possible to add the mixture of additives, which contains a mineral oil, and, at least the greater part of which mixture is in the molten state, to the dissolved or molten plastics material. By preference, measured amounts are fed to an extruder in which the plastics material is processed, e.g. into granules.

However, the present invention is also particularly suitable for plastics that are obtained as powders, e.g. by polymerization in a vehicle which may be the monomer and in which the polymer does not dissolve, or by polymerization in the gaseous phase, and the like. Powdery plastics of this type, too, are often processed in an extruder. To this end additives have so far been mixed into the powdery plastics material in the so-called dry state, since the addition to the molten plastics material, e.g. in an extruder, was objectionable, as explained above. Special mixers are required for dry blending. The process according to the invention renders an expensive powder-mixing step, or the preparation of a master batch which is subsequently mixed with the remainder of the powdered polymer admixed with additive superfluous. Though reference has been made to polyethylene solution polymerization processes, it will be clear that the present invention is not limited to the addition of additives to polyethylene or polyolefins, but that the process is applicable for the addition of additives to any thermoplastic resin.

DETAILED DESCRIPTION OF THE INVENTION

As set forth above, the invention is directed to an expedient for the addition of solid additives to the processing of thermoplastic in particular polyolefinic materials. Particularly, the process of the invention comprises mixing additives, such as heat stabilizers, antioxidants, UV-stabilizers, internal or external lubricants, antistatic agents, antiblocking agents, corrosion-inhibitors, and the like, with mineral oil, by dissolving the additive in said mineral oil, prior to the addition of such additives to the processing of thermoplastic polyolefins. The additives may be homogeneously mixed with a mineral oil by heating or melting the mixture. The additives may be homogeneously mixed with the mineral oil at temperatures lower than the melting point of said respective additives, thereby reducing or eliminating the discoloration which results from heating said additives.

The mineral oils used in the process according to the invention are the colorless or virtually colorless technical-grade white oils, which consist essentially of purified aliphatic hydrocarbons which contain hardly any aromatics or unsaturated compounds. These mineral oils, or white oils as they are called, which are substantially free of aromatic residues and unsaturated compounds, are prepared by refining lubricating-oil fractions, e.g. by solvent extraction followed by treatment with oleum. Particularly suitable technical-grade white oils are oils sold under the trade name "Risella Oil." Oils sold under the trade name "Risella Oil" are characterized by viscosities ranging from about 45 to about 105 seconds Redwood No. 1 at 140° F (60° C). When a Redwood No. 1 has a range of t (sec.) of 34 greater than t greater than 100, the corresponding kinematic viscosity (Stokes) is 0.00260 t-1.79/t. When the Redwood No. 1 has a range of t (sec.) greater than 100, the corresponding kinematic viscosity (Strokes) is 0.00247 t-0.50/t, as disclosed in the "Chemical Engineers Handbook", edited by Harold V. Crawford and Ross J. Kepler, McGraw-Hill, Inc. (1973) Page 1-27 (Fifth Edition) incorporated herein by reference.

The Risella oils, Risella 17 and Risella 29 with viscosities of about 45 and 70 seconds Redwood No. 1 at 140° F are suitable as mineral oils in accordance with the invention. However, technical-grade white oils, with viscosities ranging between 45 to about 105 seconds Redwood No. 1 may also be used. The boiling range of these oils will generally exceed 250° C. Since addition of the mineral oil-additive mixture is effected under pressure in extruding devices, low-boiling mineral oils, e.g. boiling over 150° C, may be used; such low-boiling mineral oils are used in conjunction with low-melting additives. White oils are miscible with almost all thermoplastics, especially with polyolefins. Minor amounts of finely divided non-melting compounds may be incorporated in the mixture of additives. In that event, when a mixture of additives and mineral is melted, the mass will not be completely homogeneous, but rather the melt will contain finely divided solid substances and, hence, may be more or less pasty.

The combination of fusible additives with mineral oil will melt at a considerably lower temperature than the melting point of the fusible additive alone. Because considerably lower temperatures may be used during melting and maintaining the molten phase of the mixture of mineral oil and fusible additive, discoloration problems will be greatly reduced, if not substantially eliminated. Pasty masses will form, if such molten phases of the mixture of mineral oil and fusible additives is subjected to local cooling in pipes, associated with machinery used in the processing of thermoplastic resins. Such pasty masses will not interfere with the processing of the thermoplastic resins, since such pasty masses are not substantially solid and will not plug the pipes, but will pass through those pipes, if necessary by employing additional hot white oil to dislodge the pasty mass. In accordance with the invention, the use of the molten phase of the mineral oil and additive will obviate blocked conduits, in machinery used for processing thermoplastic resins. Prior to the discovery of the invention, if a molten mixture of additives, in the absence of oil, set and hardened in a conduit of machinery, the flow of molten additives halts. The stationary melt solidifies further on heat losses, so that the conduit is completely blocked. Removal of the blocking material is time-consuming and expensive.

in polymerizations in which the polymer is obtained in solution, the molten additives in mineral oil, which may also contain minor amounts of finely divided, non-melting additive, may be added to the polymer solution immediately after the polymerization. The molten mixture is preferably added to molten polymer that has been freed of solvent.

It is particularly advantageous to effect the addition in an extruding device in which the polymer is processed, e.g., into granules.

In order to obtain the desired result, viz. a sufficient reduction of the melting point and a sufficient pasty constitution of the molten metal, the amount of mineral oil should be at least 10% by weight of the total amount of additives to be mixed with the mineral oil. In general, the amount of oil should not be so large that the final properties of the thermoplastics material will be affected appeciably. Hence, the amount of weight of oil will preferably not be larger than about 3 times the amount of weight of additives, and, most preferably, will be at most equal to the amount by weight of those additives.

It is desirable to restrict the amount of mineral oil to be added if a prospective use of the plastics material will be in packing foodstuffs. Consequently, the amount of organic products that can be extracted from the thermoplastics material should be as small as possible. The amount of oil shall preferably not exceed 0.2 to 0.3% by weight based on the weight of plastics material. In most cases the above-mentioned conditions of addition of said additives will be fulfilled. However, if relatively large amounts of additives are used, it may be necessary to use more oil than the above-mentioned 0.2 to 0.3% calculated to the amount of plastics material.

The usual stabilizers may be included in the aggregate of additives. These may give the polymer a better resistance to heat and/or oxidation. A sharp distinction between heat stabilizers and antioxidants is not always possible. For instance, hindered phenols, aromatic amines, thioether derivatives, dithiocarbamates, and other conventional and commercially available stabilizers, e.g. 2.6-di-tert.-butyl-p-cresol, 4.4'-butyl-idene-bis-(6-tert. butyl-m-cresol), 4.4'methylene bis (2.6-di-tert. butyl-phenol), octadecyl-3-(3.5-di-tert. butyl-4- hydroxyphenyl) propionate; dilauryl thiodipropionate, distearyl thiodipropionate, aryl and alkyl N-substituted p-phenylene diamines, zinc dialkyl dithiocarbamates may be used in accordance with the invention.

Conventional U.V. stabilizers, including derivatives of benzophenone of benzotriazole, for instance: 2-hydroxy-4-n-octyloxy-benzophenone, 2-hydroxy-4-dodecyloxybenzophenone, 5-chloro-2-(2-hydroxy-3'-5'-di-tert. butyl-phenyl) benzotriazole, 2.2'-dihydroxy-4-n-octyloxybenzophenone may be used as additives in accordance with the invention.

Furthermore, internal and/or external lubricants are added in most cases. External lubricants are also referred to as release agents, slip agents, and antiblocking agents. A wide variety of compounds may be used as external lubricants, including e.g. fatty acid amides.

It will be clear to any person skilled in the art that this enumeration of additives is given only by way of illustration and may be far from complete and that the additives known in the art and equivalent to those enumerated above can be used in accordance with the invention. A general survey of additives is given in 'Encyclopedia of Polymer Science and Technology' under the headings: STABILIZATION, ANTI-OXYDANTS, ANTI-OZONANTS, ANTISTATICS, LUBRICANTS and ULTRAVIOLET RADIATION ABSORBERS, which are incorporated herein by reference.

The present invention will preferably be used in the preparation and processing of polyolefins, in particular polyethylene obtained as a solution, but is not restricted thereto. The invention can also profitably be used for other types of polymers. The intended additives, such as stabilizers, lubricants, antistatics, antiblocking agents, corrosion inhibitors, are generally added in small amounts. The amount of each additive does normally not exceed 1% by weight and is preferably at most 0.2% by weight, and, more in particular, up to 0.1% by weight of said plastics material. Generally at least 0,05 of an additive is added, but even lower amounts are sometimes quite satisfactory. However, the amount of additives to be used is not critical to the process of the invention. The total amount of additives is of importance only with respect to the amount of mineral oil; if large amounts of mineral oil are used, the properties of the polymer may be affected. The amount of oil will preferably be chosen so that no, or at most minor, adverse secondary effects will occur.

The invention will be explained more fully by the following examples which show the processing of said additives with mineral oil to form mixtures which, in accordance with the invention, may be subsequently added to thermoplastic polyolefins, particularly polyethylene, melts or solutions.

EXAMPLE 1

A mixture of 1 part by weight of Irganox 1076 (n-octadecyl-2-(4-hydroxy-3.5-tert. butyl phenyl) propionate) with a melting point of 49° to 52° C, 1.25 parts by weight of Cyasorb U.V. 531 (2-hydroxy-4-n-octyloxybenzophenone) with a melting point of 48°–49° C, and 2 parts by weight of oleamide with a melting point of 76° C was melted. The mixture was melted to a homogeneous melt at 80° C. This blend could still be measured at 65° C. At lower temperatures the mixture sets to a solid mass.

0.4 or 2 parts by weight of Risella oil 17 per part by weight of Irganox 1076 were added to samples of this mixture, after which the mixture was melted into a homogeneous mass at 80° C. The mixture containing 0.4 parts by weight of Risella oil per part by weight of Irganox 1076 could still be measured as a melt at 60° C, which is only slightly lower than the mixture without Risella oil. A temperature below 60° C the melt sets to a pasty mass. It appears that this mass can easily be pressed through a conduit.

The mixture with 2 parts by weight of Risella oil per part by weight of Irganox 1076 can still be measured as a melt at 55° C and as a paste at lower temperatures down to 40° C. When this mixture is cooled in a conduit to below 55° C, so that the mass becomes pasty, the mixture can well be moved through a conduit and no plugging occurs.

EXAMPLE 2

Equal parts by weight of Risella oil 17 and Ionox 330 (1,3,5-trimethyl-2,4,6,-tri-(3,5-di-tert. butyl-4-hydroxyphenyl) benzene) were heated at 200° C to form a molten mixture. At 150° C the mixture can still be measured. A pasty mass was formed upon cooling. Ionox 330 melts at 244° C and sets to a solid mass upon cooling.

EXAMPLE 3

Equal amounts by weight of Risella oil 17 and Irganox 1010 (pentaerythritol tetra{2-(3,5-di-tert.-butyl-4-hydroxyphenyl) propionate}), the melting point of which is 122° C, were melted into a homogeneous mixture at 105° C. At 50° C the plasticity of this mixture was such that it could still be measured. At lower temperatures a pasty mass was formed which could still be pressed through a conduit at about 40° C.

What is claimed is:

1. In a process for adding to a molten thermoplastic resin or to a solution of a thermoplastic resin one or more solid additives having a melting point of up to 250° C and which are selected from the group consisting essentially of heat-stabilizers, anti-oxidants, UV-stabilizers, internal or external lubricants, antistatic agents, antiblocking agents, corrosion-inhibitors, and mixtures thereof, which are solid additives and have a melting point of at most 250° C, the improvement comprising a. mixing the said one or more additives with a mineral oil which is an aliphatic white oil being substantially non-volatile under the conditions of processing the thermoplastic and having a Redwood No. 1 ranging from between 45 and 105 seconds, wherein the aliphatic white oil is at least 10% by weight of the total amount of the additives mixed with said aliphatic white oil and wherein the amount by weight of mineral oil is at most three times the weight of the additive and wherein the amount of each of said one or more additives is at most 1% by weight of said thermoplastic resin.

b. heating said mixture to form a melt at temperatures below the melting point of the solid additive.

c. adding said melt to a thermoplastic, which is molten or in solution.

2. The process of claim 1, wherein the mineral oil has a boiling range which exceeds 250° C.

3. The process of claim 1, wherein the amount by weight of mineral oil is at most equal to the weight of the additive(s).

4. The process of claim 1, wherein the amount by weight of the mineral oil is up to 0.3% by weight based on said thermoplastic.

5. The process of claim 1, wherein the boiling point is at least 150° C.

6. The process of claim 1, wherein the amount of said additive(s) is 0.05 to 0.2% by weight based on said thermoplastic resin.

7. The process of claim 1, wherein the amount of each of said one or more additives is at least 0.05% by weight of said theremoplastic resin.

* * * * *